J. A. HOUSE.
MACHINE FOR MANUFACTURING SAWS.

No. 190,141. Patented May 1, 1877.

3 Sheets—Sheet 1.

WITNESSES

INVENTOR
James A. House.
By his Attorneys,

J. A. HOUSE.
MACHINE FOR MANUFACTURING SAWS.

No. 190,141. Patented May 1, 1877.

WITNESSES

INVENTOR
James A. House.
By his Attorneys

J. A. HOUSE.
MACHINE FOR MANUFACTURING SAWS.
No. 190,141. Patented May 1, 1877.
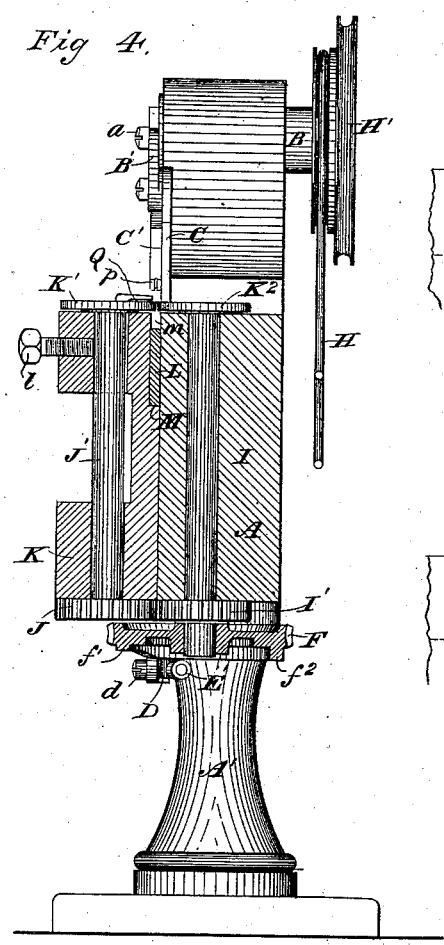
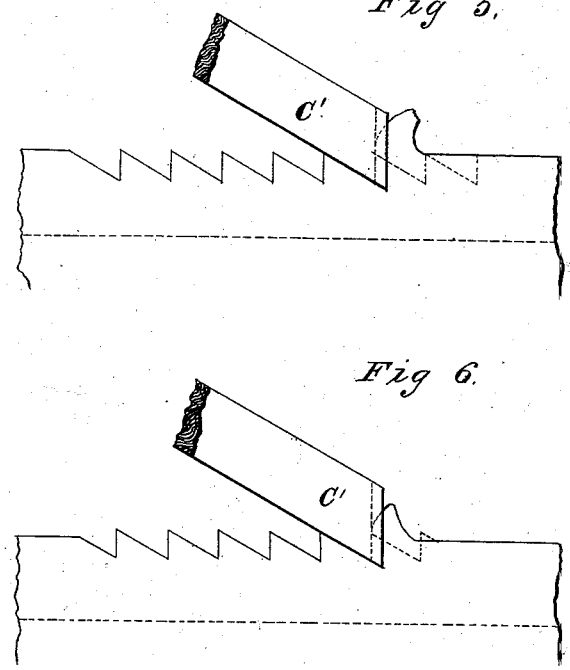
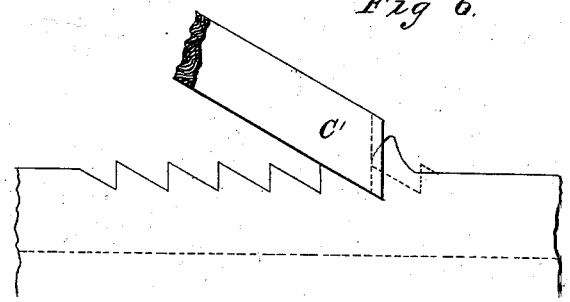
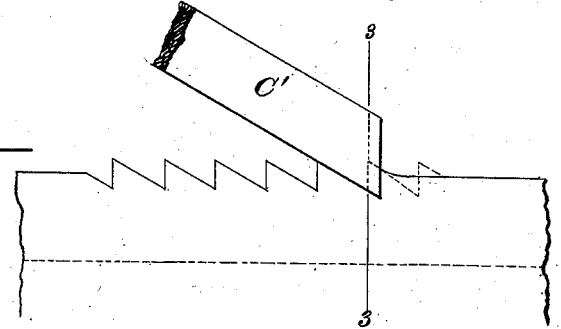
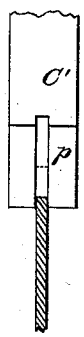
WITNESSES
INVENTOR
James A. House
By his Attorneys

UNITED STATES PATENT OFFICE.

JAMES A. HOUSE, OF BRIDGEPORT, CONNECTICUT.

IMPROVEMENT IN MACHINES FOR MANUFACTURING SAWS.

Specification forming part of Letters Patent No. 190,141, dated May 1, 1877; application filed April 11, 1877.

*To all whom it may concern:*

Be it known that I, JAMES ALFORD HOUSE, of Bridgeport, in the county of Fairfield and State of Connecticut, have invented certain new and useful Improvements in Machinery for Manufacturing Saws, of which the following is a specification:

My invention principally relates to mechanism for cutting teeth upon fret or scroll saw blades; and my improvements resemble, in some respects, the invention shown and described in an application for Letters Patent of the United States filed simultaneously herewith by me, and entitled "Improvements in the Art of Manufacturing Saw-Blades and in Apparatus therefor."

The objects of my present invention are to cut several series of teeth at intervals upon the edge of the blank, to form a number of sets of teeth in the same line upon a single long blank suitable for cutting into lengths to make separate saw-blades; to insure the regular feeding of the blank to the chisel or cutter; to cut the blank into strips of the width desired to form a series of blades; to firmly support the blank, and render it readily adjustable to gage the width of strips to be cut, and the depth of the cuts of the chisel; and generally to improve the details of the mechanism.

The subject-matter claimed will hereinafter specifically be designated.

In the accompanying drawings, my improvements are shown as embodied in the best form now known to me. Obviously, however, some of the parts may be used without the others, and in machines differing somewhat from that therein shown and hereinafter described, and the details of construction be slightly modified.

Figure 1:
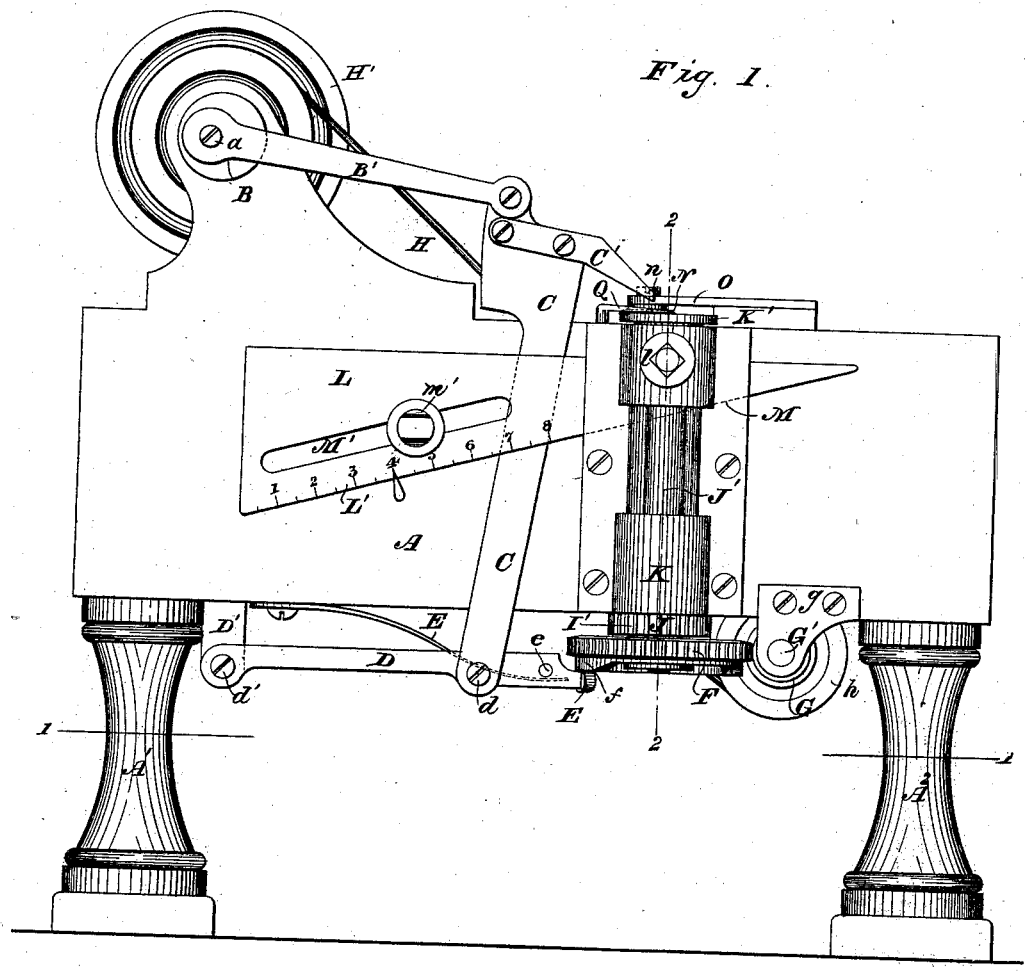
Figure 2:
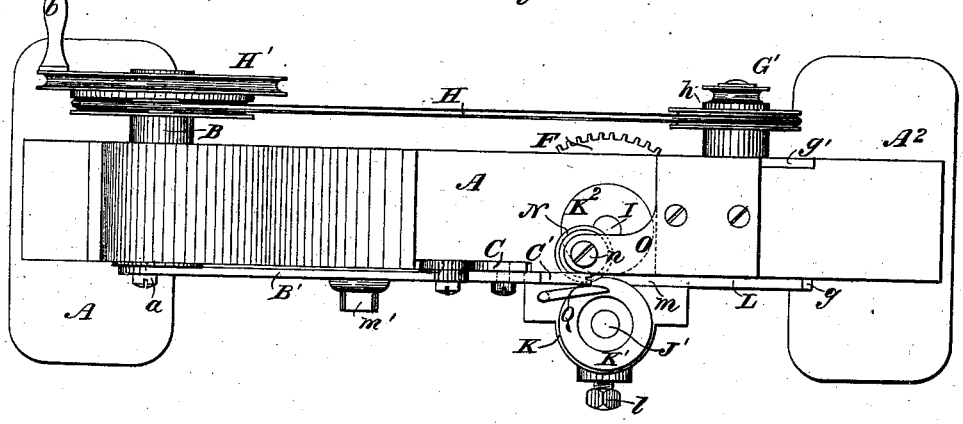
Figure 3:
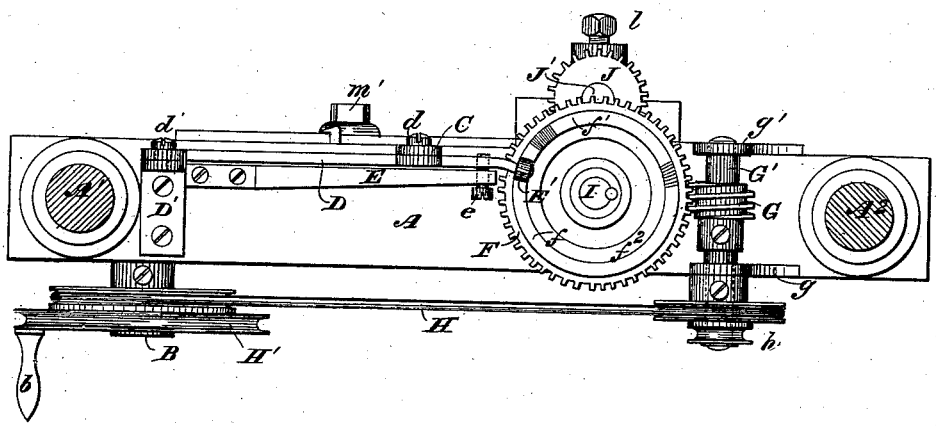

Figure 1 is a side elevation; Fig. 2, a plan or top view; Fig. 3, a bottom or inverted plan view, partly in section, through the frame-supports on the line 1 1 of Fig. 1. Fig. 4 is a view, partly in elevation and partly in vertical transverse section, on the line 2 2 of Fig. 1, showing the blank-feeding and clamping devices; and Figs. 5, 6, 7, and 8 are diagrams, on an enlarged scale, showing the method of cutting the teeth in the blades.

A stout frame, A, supported upon a proper base or supports, $A^1 A^2$, is provided with suitable bearings for a driving-shaft, B, at one end. This shaft is driven by power in any suitable way, a hand-crank, $b$, for revolving it, being shown in the drawings, for the sake of illustration only. A crank, $a$, upon the end of the shaft opposite to that upon which the hand-crank is secured, drives a pitman, B', which is jointed at its outer end to one end of a rocking arm or vibrating lever, C, the opposite or lower end of which lever is suitably pivoted to render it capable of being rocked freely by the pitman. A cutter or chisel, C', secured to this vibrating lever at its upper end and projecting outward and downward therefrom, cuts the saw-teeth in the blank, as will hereinafter be explained.

The vibrating lever C is pivoted at $d$, near the free end of a vibrating arm, D, in turn pivoted at $d'$ to the under side of the frame, or to a down-hanger, D', projecting therefrom. A strong spring, E, secured at one end to the bottom of the frame, bears upward at its opposite end upon a stud, $e$, on the arm D, thus acting with a tendency to force up this arm, and, consequently, the chisel-lever C. A roller, E, upon the outer end of the arm D, is in this way constantly pressed against an annular cam, $f$, formed upon the projecting under side of a pinion, F, meshing with a worm-wheel, G, turning with a shaft, G', mounted in suitable bearings $g\ g'$ beneath the frame. This shaft G' is shown by the drawings as driven from the driving-shaft B by a band, H; but it may be driven by any suitable gearing. This band passes from a pulley, H', on the driving-shaft to the pulley $h$ on the worm-wheel shaft. The pinion F driven by the worm-wheel is fast upon an upright shaft, I, turning in bearings in the frame, to which shaft is likewise secured a pinion, I', meshing with a corresponding pinion, J, upon a shaft, J', parallel with the shaft I. This shaft J' is mounted in suitable bearings in a bracket-frame or housing, K, at the side of the supporting-frame. Each shaft carries a feeding roller or disk, $K^1 K^2$, at its upper end, the adjacent surfaces of their peripheries nearly touching. The roller $K^1$ can be brought close to or allowed to recede from the roller $K^2$ by means of any suitable adjusting device—such, for instance, as the set-screw $l$, which passes through the bearing and abuts against the shaft at its point. The shaft is allowed sufficient lateral play in the bearing to admit of the requisite adjustment of the space between the rollers to suit the thickness of the blank to be acted upon.

An adjustable anvil or support, L, for the saw-blank and upon which the lower edge of the blank bears, is provided with a gage or indicator, L', (see Fig. 1,) by which to regulate the width of strip to be cut from the blank. This anvil slides endwise through the blank guideway formed by a recess or opening, $m$, in the bracket-frame K, (or between the bracket and supporting-frame,) see Fig. 4, and the lower inclined edge of the anvil rests and is firmly supported at or near one end upon a correspondingly inclined edge or shoulder, M, at the bottom of the guideway. The opposite end of the anvil is supported and the anvil adjusted and held as desired by a screw cap or nut, $m'$. The anvil may be slid endwise on the screw-stud, which passes through the elongated slot M'. The blank is fed forward in the guideway or recess $m$, through which it is traversed endwise. A cutter, N, shown as composed of a revolving disk, mounted upon a stud, $n$, in an arm, O, secured upon the top of the frame, serves to sever strips from the blank as they are being toothed by the passage of the blank to and past the tooth-cutter or chisel C'. An arm, Q, which may be turned out, if desired, is mounted upon the top of the bracket-frame K, and bears upon the side of the blank, thus preventing the curling or winding up of the blade as it is cut from the blank.

The chisel C' (see Fig. 8) has a central slit or opening, $p$, in its point or cutting end, of a width about corresponding to the thickness of the blank or saw-blade to be operated upon. As the chisel cuts into the edge of the blank the teeth are formed in part by raising or forcing up the metal of the blank, the surplus metal, if any, crowded out or displaced by one cut being sheared off by the succeeding cut, the blank being fed forward during each retraction of the chisel a proper distance to be acted upon at its next descent.

Fig. 5 represents the chisel as making a deep cut, all the surplus metal crowded backward and upward by one cut being removed by the next, and the points of the teeth terminating in line with the edge of the blank. In Fig. 6 the cut is not so deep, and the teeth as formed project slightly above the edge of the blank; and Fig. 7 represents a shallow cut, that which I prefer. In this last figure no metal is removed or cut off, the teeth being formed wholly by displacing or forcing upward and backward the metal of the blank to form each tooth.

The formation of rough edges or burrs at the sides of the teeth is prevented, as will be apparent from the drawings, by the chisel which straddles the blank edge and cuts close to the sides of the blade.

From the foregoing description it will be apparent that the chisel reciprocates in a slightly-curved line, as its carrying-arm C is rocked by the pitman from the driving-shaft. The saw blade or blank is fed regularly to the chisel and shearing-cutter by the feed-rollers or wheels $K^1$ $K^2$. At proper intervals the chisel is thrown out of operation by means of the cam $f$ on the pinion F, the roller E' on the end of the vibrating arm D, running alternately in contact with the recessed or cutaway part $f^1$, and regular or raised portion $f^2$ of the cam. When in contact with the latter part of the cam the cutter is held down to its work, so as to strike the blank at each stroke, but when in contact with the depression or cut-away face of the cam the chisel is elevated.

In this manner toothless spaces are left at the ends of the blank, and between each series of teeth, to form the separate blades. Obviously the blank may be severed into lengths to form blades by a cutter carried by one feed-roller, and working in a recess or nick in the periphery of the other, or other automatic severing device may be employed.

It is manifest that a considerable saving in both time and labor is effected by cutting the teeth in series upon a single blank, as described, to form a number of saws at a single traverse of the blank, and that by automatically throwing the chisel out of operation at proper intervals, unnecessary wear and tear upon the machinery which would result from the continuous action of the chisel throughout the length of the blank is avoided.

Obviously my improvements may be modified to some extent without departing from the spirit of my invention. For instance, different cams, designed to throw the cutter out of operation at longer or shorter periods, may be employed, and the arm D adjusted lengthwise by means of a series of holes, through any one of which the pivot $d'$ might be passed, so as to cause the roller E' to work upon the desired cam, or other well-known means of adjustment might be employed.

The anvil may be fed up automatically after the severing of a strip. The blank may be run back by reversing the revolution of the driving-shaft or by hand.

I claim as my invention—

1. The combination, substantially as hereinbefore set forth, of a guideway for the saw-blank, and a reciprocating chisel operating upon the edge of the blank, and automatically thrown into and out of operation at intervals, to form series or different sets of teeth with intervening untoothed spaces, whereby a number of blades are toothed at a single traverse of the blank.

2. The combination, substantially as hereinbefore set forth, of the reciprocating chisel and the saw-blank-feeding rollers by which the blank is presented to and firmly held against the thrust of the chisel reciprocating at an acute angle to the edge of the blank above the rollers, to successively cut the teeth thereon, as set forth.

3. The combination of the saw-blank clamping and feeding rollers, the cutter for severing the blank longitudinally into strips to form saw-blades, and the reciprocating chisel for toothing the blank edge, these members being constructed and operating substantially as hereinbefore set forth.

4. The adjustable endwise-moving anvil for supporting and adjusting the saw-blank, substantially as set forth.

5. The combination, substantially as hereinbefore set forth, of a guideway, in which the blank is traversed, a chisel operating upon the edge of the blank, and reciprocating above in the same plane as and at an inclination to the blank, and an anvil adjustable in the blank guideway, and supporting the blank.

6. The combination of the chisel reciprocating above the traversing saw-blank, the rocking lever, to one end of which the chisel is secured, the vibrating arm, to which said lever is pivoted at its opposite end, and a cam operating upon said vibrating arm, these numbers being constructed and operating substantially as hereinbefore set forth, to automatically throw the chisel into and out of operation.

In testimony whereof I have hereunto subscribed my name.

JAMES ALFORD HOUSE.

Witnesses:
CHARLES H. DIMOND,
FREDK. L. HEARSON.